US010362070B1

(12) United States Patent
Rupavatharam et al.

(10) Patent No.: US 10,362,070 B1
(45) Date of Patent: Jul. 23, 2019

(54) METHOD, SYSTEM, AND APPARATUS FOR ACHIEVING USER SPACE INTERVENTION DURING CONNECTION-ESTABLISHMENT HANDSHAKES

(71) Applicant: Juniper Networks, Inc., Sunnyvale, CA (US)

(72) Inventors: Sreekanth Rupavatharam, Campbell, CA (US); Hariprasad Shanmugam, Kanata (CA); Erin C. MacNeil, Carp (CA)

(73) Assignee: Juniper Networks, Inc, Sunnyvale, CA (US)

( * ) Notice: Subject to any disclaimer, the term of this patent is extended or adjusted under 35 U.S.C. 154(b) by 162 days.

(21) Appl. No.: 15/241,834

(22) Filed: Aug. 19, 2016

(51) Int. Cl.
*H04L 29/06* (2006.01)
*H04L 5/00* (2006.01)
*H04L 29/08* (2006.01)

(52) U.S. Cl.
CPC ........ *H04L 65/1069* (2013.01); *H04L 5/0048* (2013.01); *H04L 67/1095* (2013.01)

(58) Field of Classification Search
CPC ............. H04L 65/1069; H04L 67/1095; H04L 5/0048
See application file for complete search history.

(56) References Cited

U.S. PATENT DOCUMENTS

| | | | |
|---|---|---|---|
| 2003/0120935 A1* | 6/2003 | Teal | G06F 21/57 713/188 |
| 2007/0100902 A1* | 5/2007 | Sinha | G06F 17/30581 |
| 2009/0049107 A1* | 2/2009 | Yamaguchi | G06F 17/30575 |
| 2011/0252132 A1* | 10/2011 | Wetzer | G06F 9/542 709/224 |
| 2014/0082043 A1* | 3/2014 | Heitz | H04L 69/16 709/202 |
| 2017/0027008 A1* | 1/2017 | Krishnamoorthy | H04W 76/14 |
| 2017/0149885 A1* | 5/2017 | Kaplan | H04L 67/1095 |

OTHER PUBLICATIONS

Transmission Control Protocol (TCP) Segment Header, http://www.omnisecu.com/tcpip/tcp-header.php, as accessed Jul. 1, 2016, (Oct. 26, 2013).
TCP 3-Way Handshake (SYN,SYN-ACK,ACK), http://www.inetdaemon.com/tutorials/internet/tcp/3-way_handshake.shtml, as accessed Jul. 1, 20116, (On or before Sep. 1, 2013).

* cited by examiner

Primary Examiner — Uzma Alam
(74) Attorney, Agent, or Firm — FisherBroyles, LLP (57) ABSTRACT

The disclosed method may include (1) receiving a synchronize message from a computing device to initiate synchronization between the computing device and a server with respect to a communication protocol, (2) notifying an application in user space on the server of the synchronize message such that the application in user space selects at least one attribute to be applied to a communication session resulting from the synchronization between the computing device and the server, (3) sending a synchronize acknowledgment that identifies the attribute selected by the application in user space to the computing device to further the synchronization between the computing device and the server, and then (4) establishing the communication session with the attribute selected by the application in user space upon receiving an acknowledgment message from the computing device to complete the synchronization. Various other methods, systems, and apparatuses are also disclosed.

18 Claims, 5 Drawing Sheets

METHOD, SYSTEM, AND APPARATUS FOR ACHIEVING USER SPACE INTERVENTION DURING CONNECTION-ESTABLISHMENT HANDSHAKES

BACKGROUND

In the context of networking and/or communications, computing devices often establish, configure, and/or coordinate connections with one another via connection-establishment handshakes. For example, a client device and a server may establish a Transmission Control Protocol (TCP) connection with one another over an Internet Protocol (IP) network by way of a TCP handshake. In this example, the TCP connection may enable applications running on the client device and the server to communicate with one another via the IP network.

Some traditional connection-establishment handshakes may be performed exclusively in kernel space. For example, the operating system kernel on the client device may initiate the TCP handshake by sending a synchronize message (sometimes referred to as a SYN) to the server. In this example, the operating system kernel on the server may receive the SYN from the client device and then, in response, send back a synchronize acknowledgement (sometimes referred to as a SYN-ACK). Upon receiving the SYN-ACK from the server, the operating system kernel on the client device may send an acknowledgment message (sometimes referred to as an ACK) to the server. The completion of these 3 operations (SYN, SYN-ACK, and ACK) may mark the successful establishment of a TCP connection between the client device and the server.

Unfortunately, since such traditional connection-establishment handshakes are performed exclusively in kernel space, the applications communicating with one another via the TCP connection may have little, if any, involvement in the configuration of the TCP connection. For example, the TCP connection may be intended for and/or involve an application installed and/or running in user space on the server. However, during the TCP handshake, this application may be unaware that the TCP handshake is even taking place. Accordingly, the application may become aware of the TCP connection only after the server has received the ACK from the client device and the TCP connection has been successfully established. As a result, the application may be unable to select certain attributes (such as the maximum segment size and/or socket options) of the TCP connection, which could potentially necessitate post-connection adjustments and/or lead to communication interruptions and/or failures.

The instant disclosure, therefore, identifies and addresses a need for improved and/or additional methods, systems, and apparatuses for achieving user space intervention during connection-establishment handshakes.

SUMMARY

As will be described in greater detail below, the instant disclosure generally relates to methods, systems, and apparatuses for achieving user space intervention during connection-establishment handshakes. In one example, a method for accomplishing such a task may include (1) receiving a synchronize message from a computing device to initiate synchronization between the computing device and a server with respect to a communication protocol, (2) notifying an application in user space on the server of the synchronize message such that the application in user space selects at least one attribute to be applied to a communication session resulting from the synchronization between the computing device and the server, (3) sending a synchronize acknowledgment that identifies the attribute selected by the application in user space to the computing device to further the synchronization between the computing device and the server, and then (4) establishing the communication session with the attribute selected by the application in user space upon receiving an acknowledgment message from the computing device to complete the synchronization.

Similarly, a system that performs the above-described method may include various modules that are stored in memory on a server and executed by a physical processor on the server. For example, a system that performs the above-described method may include (1) a receiving module that receives a synchronize message from a computing device to initiate synchronization between the computing device and the server with respect to a communication protocol, (2) a notification module that notifies an application in user space on the server of the synchronize message such of the application in user space selects at least one attribute to be applied to a communication session resulting from the synchronization between the computing device and the server, (3) a transmission module that (A) sends a synchronize acknowledgment that identifies the attribute selected by the application in user space to the computing device to further the synchronization between the computing device and the server and then (B) establishes a communication session with the attribute selected by the application in user space upon receiving an acknowledgment message from the computing device to complete the synchronization.

A corresponding apparatus may include (1) at least one storage device that stores (A) an operating system kernel that manages computer hardware and software processes in kernel space on the server and (B) a user space application that runs in user space on the server and (2) at least one physical processor communicatively coupled to the storage device, wherein the physical processor (A) receives a synchronize message from a computing device to initiate synchronization between the computing device and the server with respect to a communication protocol, (B) notifies an application in user space on the server of the synchronize message such that the application in user space selects at least one attribute to be applied to a communication session resulting from the synchronization between the computing device and the server, (C) sends a synchronize acknowledgment that identifies the attribute selected by the application in user space to the computing device to further the synchronization between the computing device and the server, and then (D) establishes the communication session with the attribute selected by the application in user space upon receiving an acknowledgment message from the computing device to complete the synchronization.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for achieving user space intervention during connection-establishment handshakes. As will be explained in greater detail below, embodiments of the instant disclosure may enable applications in user space to select certain attributes of communication sessions (such as TCP connections) during connection-establishment handshakes (such as TCP handshakes). As a result, these embodiments may enable the applications in user space to configure, customize, and/or cater certain aspects of such communication sessions to accommodate their own needs. By enabling the applications to configure, customize, and/or cater such aspects of communication sessions, these embodiments may mitigate and/or eliminate the need for post-connection adjustments to the communication sessions. Additionally or alternatively, these embodiments may mitigate and/or eliminate communication interruptions and/or failures that result from improper selection of attributes and/or parameters by operating system kernels that had traditionally made such selections without any user space involvement.

Figure 1:
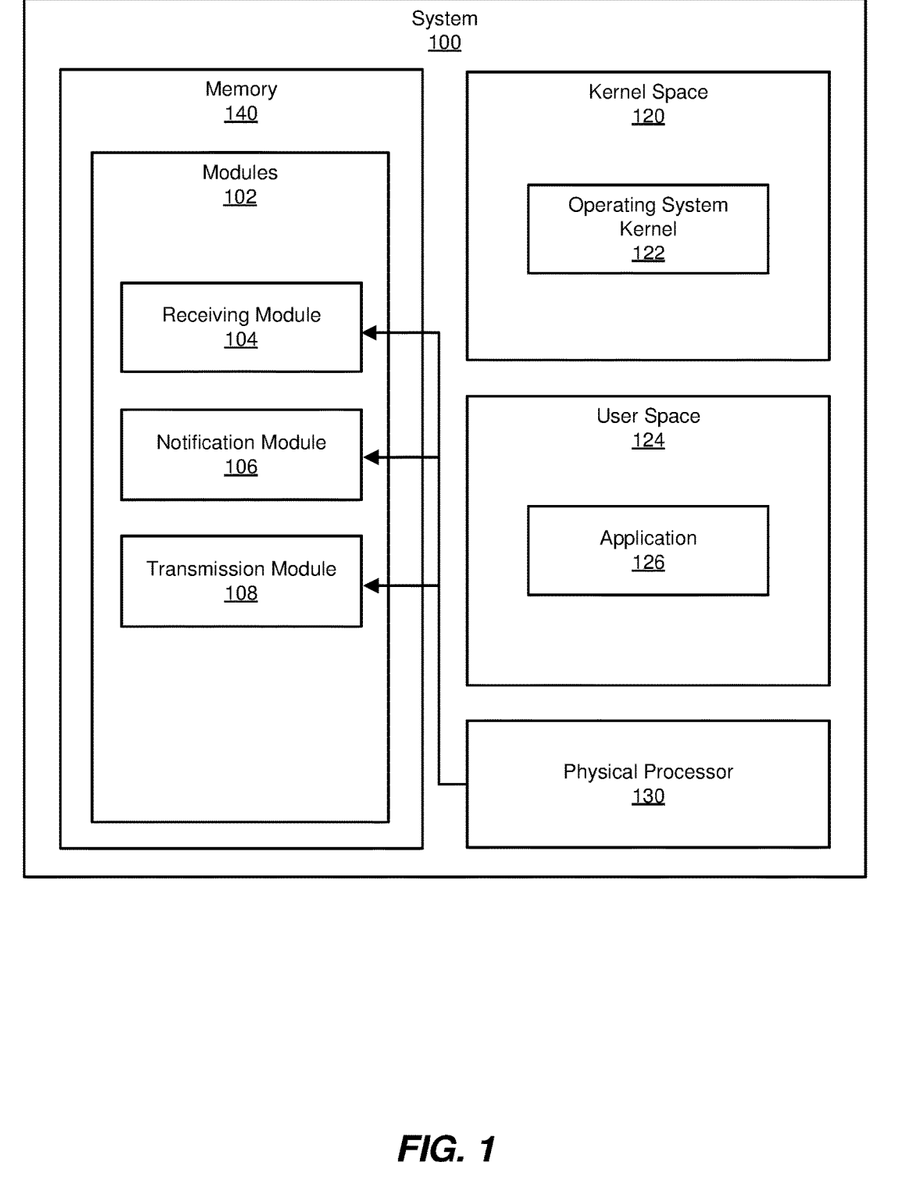
FIG. 1 is a block diagram of an exemplary apparatus for achieving user space intervention during connection-establishment handshakes.
Figure 2:
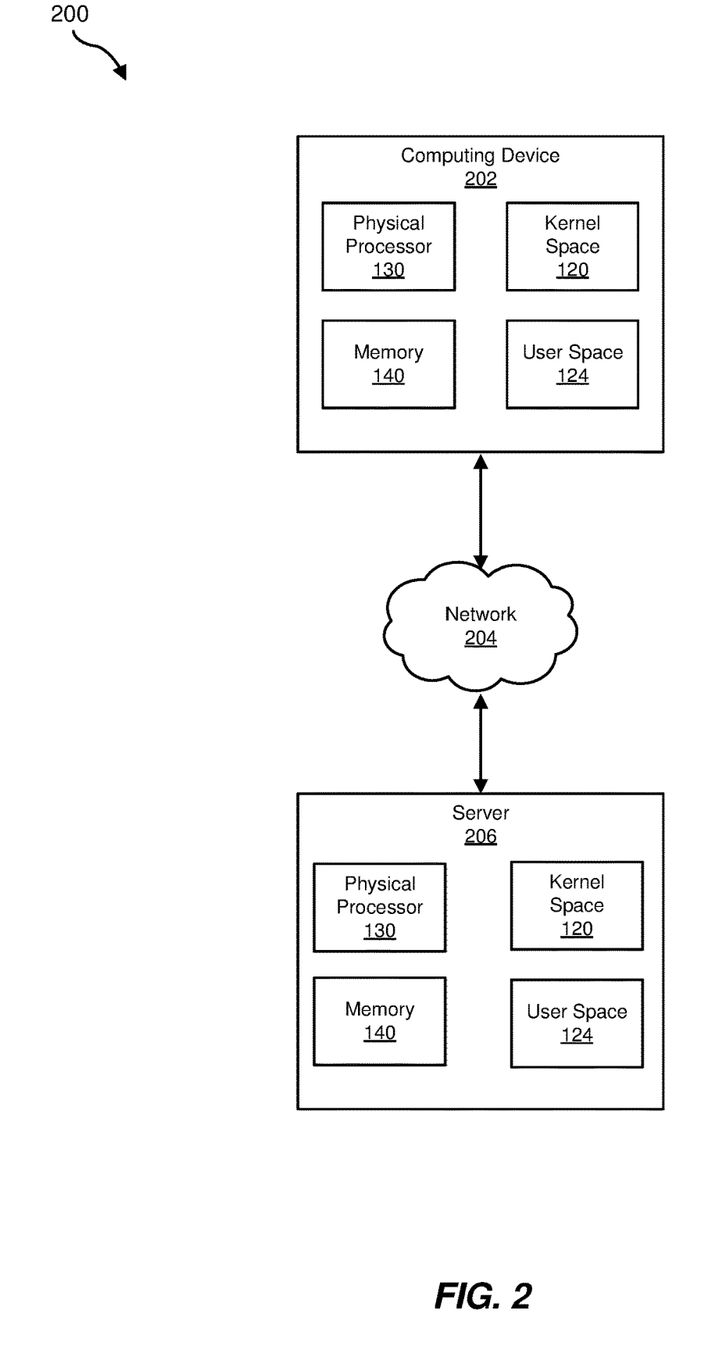
FIG. 2 is a block diagram of an exemplary apparatus for achieving user space intervention during connection-establishment handshakes.

The following will provide, with reference to FIGS. 1-2, examples of systems and/or apparatuses that achieve user space intervention during connection-establishment handshakes. The discussion corresponding to FIG. 3 will provide a detailed description of an exemplary method for achieving user space intervention during connection-establishment handshakes. The discussion corresponding to FIG. 4 will provide a detailed description of an exemplary connection-establishment handshake with respect to timing. Finally, the discussion corresponding to FIG. 5 will provide numerous examples of systems that may include the components shown in FIGS. 1-2.

FIG. 1 is a block diagram of an exemplary system 100 for achieving user space intervention during connection-establishment handshakes. As illustrated in this figure, exemplary system 100 may include one or more modules 102 for performing one or more tasks. As will be explained in greater detail below, modules 102 may include a receiving module 104, a notification module 106, and/or a transmission module 108. Although illustrated as separate elements, one or more of modules 102 in FIG. 1 may represent portions of a single module, framework, and/or application. Additionally or alternatively, one or more of modules 102 in FIG. 1 may represent portions of a single operating system (such as JUNIPER NETWORK'S JUNOS) and/or kernel.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as any of the devices illustrated in FIG. 2 (e.g., computing device 202 and/or server 206) and/or computing system 510 in FIG. 5. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable memory.

As illustrated in FIG. 1, exemplary system 100 may also include one or more physical processors, such as physical processor 130. Physical processor 130 generally represents any type or form of hardware implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to achieve user space intervention during connection-establishment handshakes. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include kernel space 120. The term "kernel space," as used herein, generally refers to any type or form of memory and/or address space that has been designated for and/or allocated to an operating system kernel and/or operating system components. In one example, kernel space 120 may include and/or represent an operating system kernel 122. In this example, operating system kernel 122 may manage and/or mediate access to computing and/or network resources in connection with an operating system. Additionally or alternatively, operating system kernel 122 may manage computer hardware and/or software processes in and/or from kernel space 120.

As illustrated in FIG. 1, exemplary system 100 may additionally include user space 124. The term "user space," as used herein, generally refers to any type or form of memory and/or address space that has been designated for and/or allocated to application software and/or components. In one example, user space 124 may include and/or represent an application 126. In this example, application 126 may run and/or operate in user space 124. Additionally and/or alternatively, application 126 may be involved and/or participate in a communication session that results from a connection-establishment handshake between a computing device and a server.

In some examples, kernel space 120 and user space 124 may include and/or represent mutually exclusive virtual memory allocations and/or execution contexts that are separate and/or segregated from one another. As an example, user space 124 may include and/or represent a specific address space at a client site, and kernel space 120 may include and/or represent a different address space at a remote site. In this example, the client site and the remote site may be located on and/or represented as separate physical devices within a network. Additionally or alternatively, the client site and the remote site may be located on and/or represented as different address spaces on a single physical device. Accordingly, the client site and the remote site may represent different physical and/or virtual sites.

Exemplary system 100 and FIG. 1 may be implemented in a variety of ways and/or contexts. For example, all or a portion of exemplary system 100 may represent portions of exemplary system 200 in FIG. 2. As shown in FIG. 2, system 200 may include a computing device 202 and a server 206 in communication with one another via a network 204. Although FIG. 2 illustrates computing device 202 and server 206 as being external to network 204, one or more of these devices may alternatively represent part of and/or be included in network 204. Various other computing devices (not necessarily illustrated in FIG. 2) may also represent part of and/or be included in system 200 and/or network 204.

In one example, computing device 202 may include instances of physical processor 130 and/or memory 140. Additionally or alternatively, computing device 202 may include instances of kernel space 120 and/or user space 124. Processor 130 in computing device 202 may be programmed to execute one or more of modules 102 stored in memory 140. Similarly, processor 130 in computing device 202 may be programmed to execute operating system kernel 122 in kernel space 120 and/or application 126 in user space 124.

In one example, server 206 may include instances of physical processor 130 and/or memory 140. Additionally or alternatively, server 206 may include instances of kernel space 120 and/or user space 124. Processor 130 in server 206 may be programmed to execute one or more of modules 102 stored in memory 140. Similarly, processor 130 in computing device 202 may be programmed to execute operating system kernel 122 in kernel space 120 and/or application 126 in user space 124.

As will be described in greater detail below, one or more of modules 102 from FIG. 1 may, when executed by at least one processor of computing device 202 or server 206, achieve user space intervention during connection-establishment handshakes. In one example, server 206 may be programmed with one or more of modules 102 that are stored in memory 140 and/or executable by physical processor 130. In this example, server 206 may enable application 126 to select certain attributes and/or parameters for a communication session that results from a connection-establishment handshake between computing device 202 and server 206. For example, application 126 may select a Maximum Segment Size (MSS), certain socket options, and/or node or identity information.

Computing device 202 generally represents any type or form of computing device capable of reading computer-executable instructions. In one example, computing device 202 may include and/or represent a client device that is attempting to establish a TCP connection with server 206 by way of a connection-establishment handshake. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device capable of establishing communication sessions and/or connections with other computing devices. In one example, server 206 may include and/or represent a web server that hosts a resource (such as a website and/or webpage) that computing device 202 is attempting to access. Additionally or alternatively, server 206 may include and/or represent a network device (such as a router, a switch, and/or a gateway) that forwards traffic to a destination within a network. Additional examples of server 206 include, without limitation, security servers, application servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. Network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
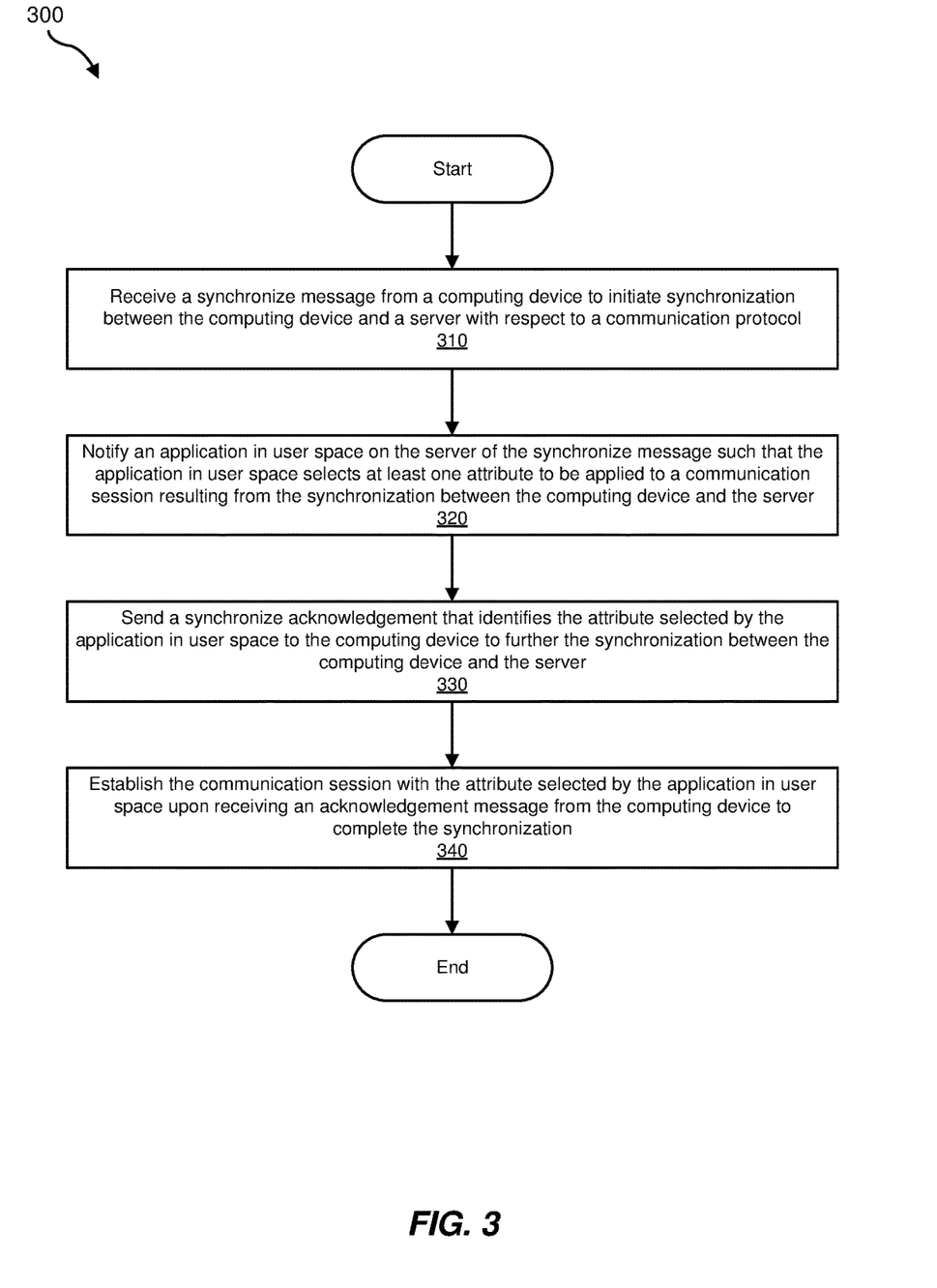
FIG. 3 is a flow diagram of an exemplary method for achieving user space intervention during connection-establishment handshakes.

FIG. 3 is a flow diagram of an exemplary computer-implemented method 300 for achieving user space intervention during connection-establishment handshakes. The steps shown in FIG. 3 may be performed by any suitable computer-executable code and/or computing system, including system 100 in FIG. 1, system 200 in FIG. 2, system 500 in FIG. 5, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive a synchronize message from a computing device to initiate synchronization between the computing device and the server with respect to a communication protocol. For example, receiving module 104 may, as part of server 206 in FIG. 2, receive a synchronize message from computing device 202 via network 204. In this example, the synchronize message may initiate synchronization between computing device 202 and server 206 with respect to a communication protocol. The synchronize message may include and/or specify a sequence number generated and/or selected by computing device 202. This sequence number may be used by computing device 202 and/or server 206 to ensure proper synchronization.

In one example, the communication protocol may facilitate communication between computing device 202 and server 206 via the transport layer or Layer 4 of the Open Systems Interconnection (OSI) model. As a specific example, the communication protocol may include and/or represent TCP. Additionally, the communication protocol may include and/or represent the HyperText Transfer Protocol (HTTP).

The systems described herein may perform step 310 in a variety of ways and/or contexts. In some examples, receiving module 104 may receive the synchronize message from computing device 202 during a TCP handshake. For example, server 206 may open, create, and/or get a socket that binds to and/or is associated with a particular port on server 206. In this example, the socket may be managed by operating system kernel 122 in kernel space 120 on server 206.

In one example, the socket may have a socket address that includes and/or consists of the IP address of server 206 and a particular port that identifies a particular application in user space on server 206. This application in user space on server 206 may represent the target and/or destination of traffic that originates from computing device 202 in connection with a TCP session established as a result of a three-way TCP handshake.

Continuing with this example, after the socket is bound to and/or associated with that port on server 206, receiving module 104 may listen for any connection requests and/or attempts on that socket and/or port. While listening for any connection requests and/or attempts in this way, receiving module 104 may receive an incoming synchronize message via that socket. This incoming synchronize message may have originated from computing device 202 and/or be directed to or intended for establishing a TCP connection between computing device 202 and server 206 via that socket.

Returning to FIG. 3, at step 320 one or more of the systems described herein may notify an application in user space on the server of the synchronize message such that the application in user space selects at least one attribute to be applied to a communication session resulting from the synchronization between the computing device and the server. For example, notification module 106 may, as part of server 206 in FIG. 2, notify application 126 in user space 124 of the synchronize message received from computing device 202. In response to this synchronize message, application 126 in user space 124 may select at least one attribute and/or parameter to be applied to a communication session resulting from the synchronization between computing device 202 and server 206. Examples of this attribute and/or parameter include, without limitation, an MSS, a socket option, certain node and/or identity information, variations or combinations of one or more of the same, and/or any other suitable attribute and/or parameter.

The systems described herein may perform step 320 in a variety of ways and/or contexts. In some examples, notification module 106 may notify application 126 of the synchronize message by delivering at least a portion of the synchronize message to application 126. In one example, notification module 106 may send an accept system call that includes certain details about the synchronize message to application 126. For example, notification module 106 may direct operating system kernel 122 to send, to application 126, an accept system call that specifies the identity of computing device 202 from which the synchronize message originated.

As a specific example, notification module 106 may generate an accept system call that includes the IP address of computing device 202 as an argument and/or parameter. Notification module 106 may then send the accept system call to application 126 in user space 124. Upon receiving this accept system call, application 126 in user space 124 may decide whether to establish a TCP connection with computing device 202 based at least in part on the IP address included in the accept system call. In other words, application 126 in user space 124 may decide whether to establish the TCP connection based at least in part on the identity of computing device 202.

In one example, server 206 may initiate and/or institute a new system call option that enables user space 124 to intervene and/or participate in the TCP handshake. For example, server 206 may create and/or configure the socket to involve application 126 in user space 124 by way of a sequence of specific system calls. As a specific example, server 206 may call "socket( )," "setsockopt( )," "bind( )," "listen( )," and "accept( )" in this order. In this example, the "setsockopt( )" system call may enable and/or activate the option to involve application 126 in the TCP handshake.

By involving application 126 in the TCP handshake in this way, server 206 may enable application 126 to select certain attributes and/or parameters of the resulting TCP connection. Accordingly, this involvement of user space 124 may enable application 126 to configure, customize, and/or cater certain aspects of the resulting TCP connection to accommodate its own needs. As a result, this involvement of user space 124 may mitigate and/or eliminate the need for post-connection adjustments to the TCP connection. Additionally or alternatively, this involvement of user space 124 may mitigate and/or eliminate communication interruptions and/or failures that traditionally resulted from improper selection of attributes and/or parameters by operating system kernels that had exclusive control over such TCP handshakes.

In some examples, application 126 may decide to update certain state on server 206 based at least in part on the IP address and/or identity of computing device 202. For example, application 126 may decide to update certain state and/or settings within itself based at least in part on and/or to accommodate the TCP connection between computing device 202 and server 206. Additionally or alternatively, application 126 may decide update certain state and/or settings in other areas of server 206 based at least in part on and/or to accommodate the TCP connection between computing device 202 and server 206.

Returning to FIG. 3, at step 330 one or more of the systems described herein may send a synchronize acknowledgment that identifies the attribute selected by the application in user space to the computing device to further the synchronization between the computing device and the server. For example, transmission module 108 may, as part of server 206 in FIG. 2, send a synchronize acknowledgment that identifies the attribute selected by application 126 in user space 124 to computing device 202 to further the synchronization between computing device 202 and server 206. In this example, the synchronize acknowledgment may include an acknowledgment number. This acknowledgment number may represent and/or amount to the initial sequence number included in the synchronize message incremented by 1. In other words, this acknowledgment number may be represented by the following formula: synchronize acknowledgement's acknowledgment number=synchronize message's sequence number+1.

In one example, the synchronize acknowledgment may also include and/or specify a sequence number generated and/or selected by server 206. These sequence and acknowledgment numbers may be used by computing device 202 and/or server 206 to ensure proper synchronization.

The systems described herein may perform step 330 in a variety of ways and/or contexts. In some examples, transmission module 108 may send the synchronize acknowledgment to computing device 202 upon identifying the attribute and/or parameter selection made by application 126 in user space 124. In one example, application 126 may select and/or choose a specific attribute and/or parameter to apply to the TCP connection resulting from the connection-establishment handshake. For example, application 126 may select 1300 bytes as the MSS for the TCP connection based at least in part on the IP address and/or identity of computing device 202. Upon making this selection, application 126 may notify operating system kernel 122 in kernel space 120 that the MSS should be set to 1300 bytes for the resulting TCP connection.

As this notification arrives at operating system kernel 122 in kernel space 120, transmission module 108 may generate a synchronization acknowledgment that includes and/or identifies the MSS as 1300 bytes. Transmission module 108 may then send this synchronization acknowledgment to computing device 202 via network 204. Upon receiving the synchronization acknowledgment, computing device 202 may set and/or apply 1300 bytes as the MSS for the TCP connection with server 206.

Returning to FIG. 3, at step 340 one or more of the systems described herein may establish the communication session with the attribute selected by the application in user space upon receiving an acknowledgment message from the computing device to complete the synchronization. For example, transmission module 108 may, as part of server 206 in FIG. 2, establish the TCP connection and/or session between computing device 202 and server 206 upon receiving an acknowledgment message from computing device 202. In this example, the acknowledgment message may mark the completion of the connection-establishment handshake.

In one example, the acknowledgment message may include an acknowledgment number. This acknowledgment number may represent and/or amount to the sequence number included in the synchronize acknowledgment incremented by 1. In other words, this acknowledgment number may be represented by the following formula: acknowledgment's acknowledgment number=synchronize acknowledgment's sequence number+1.

In one example, the acknowledgment message may also include and/or specify a sequence number. This sequence number may represent and/or amount to the same as the acknowledgment number included in the synchronize acknowledgment. In other words, this sequence number may be represented by the following formula: acknowledgment's sequence number=synchronize acknowledgement's acknowledgment number=synchronize message's sequence number+1. These sequence and acknowledgment numbers may be used by computing device 202 and/or server 206 to ensure proper synchronization.

The systems described herein may perform step 340 in a variety of ways and/or contexts. In one example, transmission module 108 may establish the communication session by having completed the connection-establishment handshake. For example, computing device 202 and server 206 may exchange and/or negotiate TCP details during the connection-establishment handshake. These TCP details may be applied to the TCP connection that results from the connection-establishment handshake.

As discussed above, transmission module 108 may send a synchronize acknowledgment that identifies one or more TCP details selected by application 126 in user space 124. Computing device 202 and server 206 may apply these TCP details selected by application 126 to the TCP connection that results from the completion of the connection-establishment handshake. Accordingly, once server 206 receives the acknowledgment message from computing device 202 in connection with the connection-establishment handshake, transmission module 108 may initiate, instantiate, and/or consummate the TCP connection between computing device 202 and server 206. This TCP connection may implement the TCP details selected by application 126 during the connection-establishment handshake.

In some examples, receiving module 104 and/or transmission module 108 may enable server 206 to communicate with computing device 202 via the TCP connection to which the TCP details selected by application 126 have been applied. For example, the TCP connection may represent a full-duplex communication session in which computing device 202 and server 206 communicate with one another. In this example, receiving module 104 may enable application 126 to receive communications from computing device 202 via the TCP connection. Additionally or alternatively, transmission module 108 may enable application 126 to send communications to computing device 202 via the TCP connection.

In some examples, notification module 106 may generate another accept system call intended to indicate the completion of the connection-establishment handshake. Notification module 106 may then send this other accept system call to application 126 in user space 124. Upon receiving this accept system call, application 126 in user space 124 may be aware of the successful establishment of the TCP connection that resulted from the connection-establishment handshake.

As mentioned above, in addition to selecting certain attributes to be applied to a communication session, application 126 may also decide whether to accept or reject the communication session altogether. For example, receiving module 104 may receive a synchronize message from another computing device (not illustrated in FIG. 2). This synchronize message may be intended to initiate synchronization between that other computing device and server 206 with respect to a TCP connection. In response to receiving this synchronize message, notification module 106 may notify application 126 in user space 124 of the synchronize message such that application 126 is able to determine whether to establish a TCP connection with that other computing device.

In this example, application 126 may check the IP address of the other computing device against a blacklist of suspicious and/or malicious identities and/or a whitelist of trusted identities. In the event that the IP address of the other computing device is included in that blacklist, application 126 may reject the other computing device's attempt to establish a TCP connection. Accordingly, application 126 may notify operating system kernel 122 of this rejection. For example, application 126 may send a directive to refuse to establish a TCP connection with the other computing device due at least in part to the IP address and/or identity of the other computing device. In response to this directive, operating system kernel 122 may refuse to send a corresponding synchronize acknowledgment to the other computing device. In doing so, operating system kernel 122 may ensure that a TCP connection is not established between the other computing device and server 206.

Figure 4:
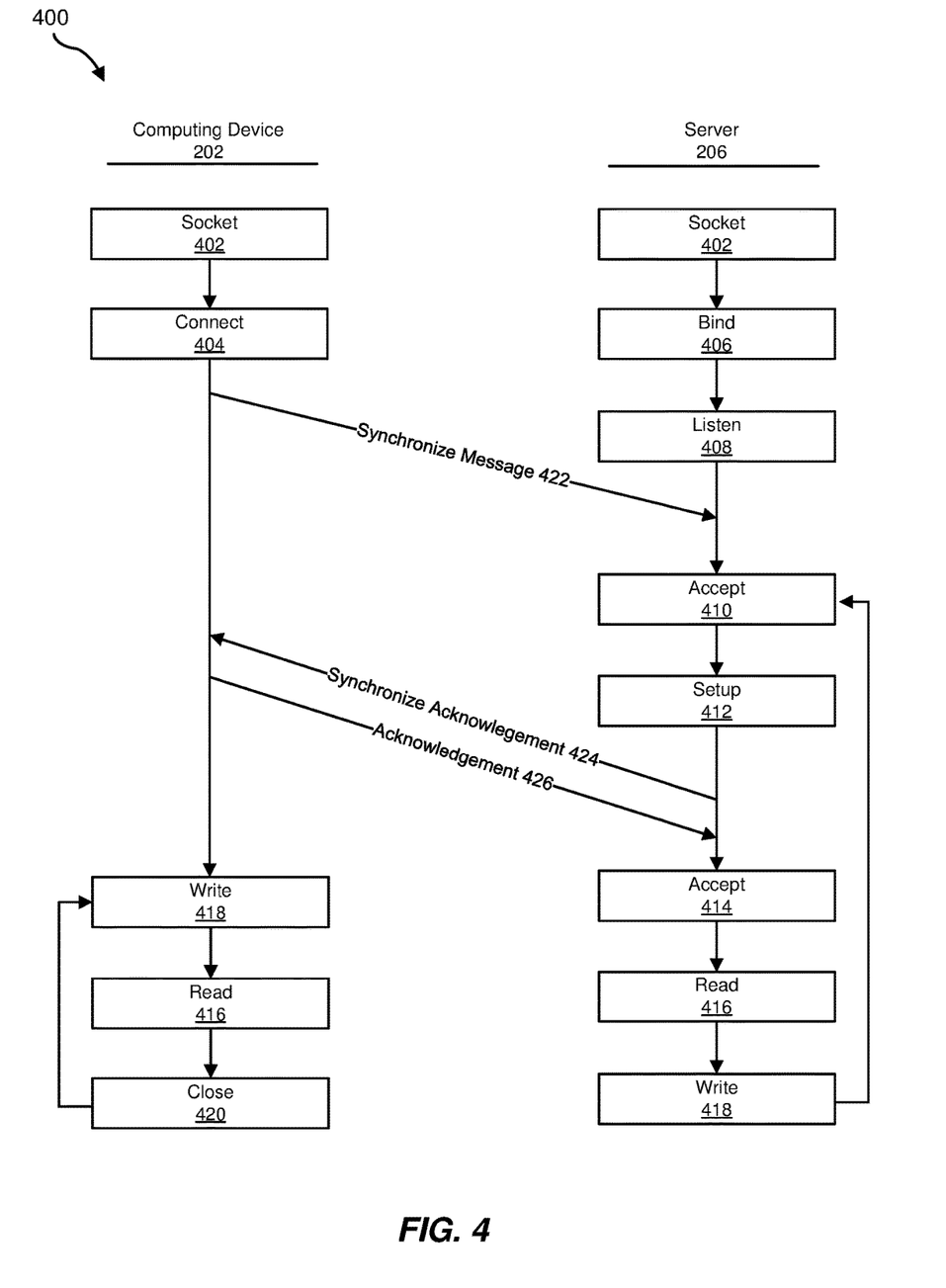
FIG. 4 is a timing diagram of an exemplary connection-establishment handshake that involves intervention from user space.

As explained above in connection with FIGS. 1-3, an operating system kernel on the server may involve an application in user space in a connection-establishment handshake. As a specific example, computing device 202 and server 206 may engage in a connection-establishment handshake to establish a TCP connection with one another in timing diagram 400 in FIG. 4. As illustrated in FIG. 4, computing device 202 may create and/or get a socket 402 and initiate a connect 404 that launches a three-way connection-establishment handshake between computing device 202 and server 206. Similarly, server 206 may create and/or get a socket 402 and then bind 406 the socket to a particular port in kernel space. Upon binding the socket to the port, server 206 may listen 408 for any connection requests and/or attempts on that socket and/or port in kernel space.

Upon initiating the connect, computing device 202 may issue and/or send a synchronize message 422 to server 206. While listening to the socket and/or port, server 206 may receive synchronize message 422 from computing device 202 in kernel space. Server 206 may then issue and/or send an accept call 410 from kernel space to an application in user space. The application in user space may receive the accept call and then notify the kernel of certain attributes and/or parameters (such as the MSS, certain socket options, and/or node or identity information) to be applied to the resulting TCP connection between computing device 202 and server 206.

In response to the notification from the application in user space, server 206 may configure setup 412 of the TCP connection to incorporate the attributes and/or parameters selected by the application in user space. Server 206 may then issue and/or send synchronize acknowledgment 424 back to computing device 202. Upon receiving synchronize acknowledgment 424, computing device 202 may issue and/or send acknowledgment 426 to server 206 to complete the connection-establishment handshake for the TCP connection.

In response to acknowledgment 426, server 206 may issue and/or send another accept call 414 from kernel space to the application in user space. At this point in time, the application may become aware of the successful establishment of the TCP connection between computing device 202 and server 206 based at least in part on the other accept call. Computing device 202 and server 206 may then communicate with one another via the TCP connection by issuing and/or sending at least one read 416 and/or write 418 via the TCP connection until the TCP connection is closed 420.

Figure 5:
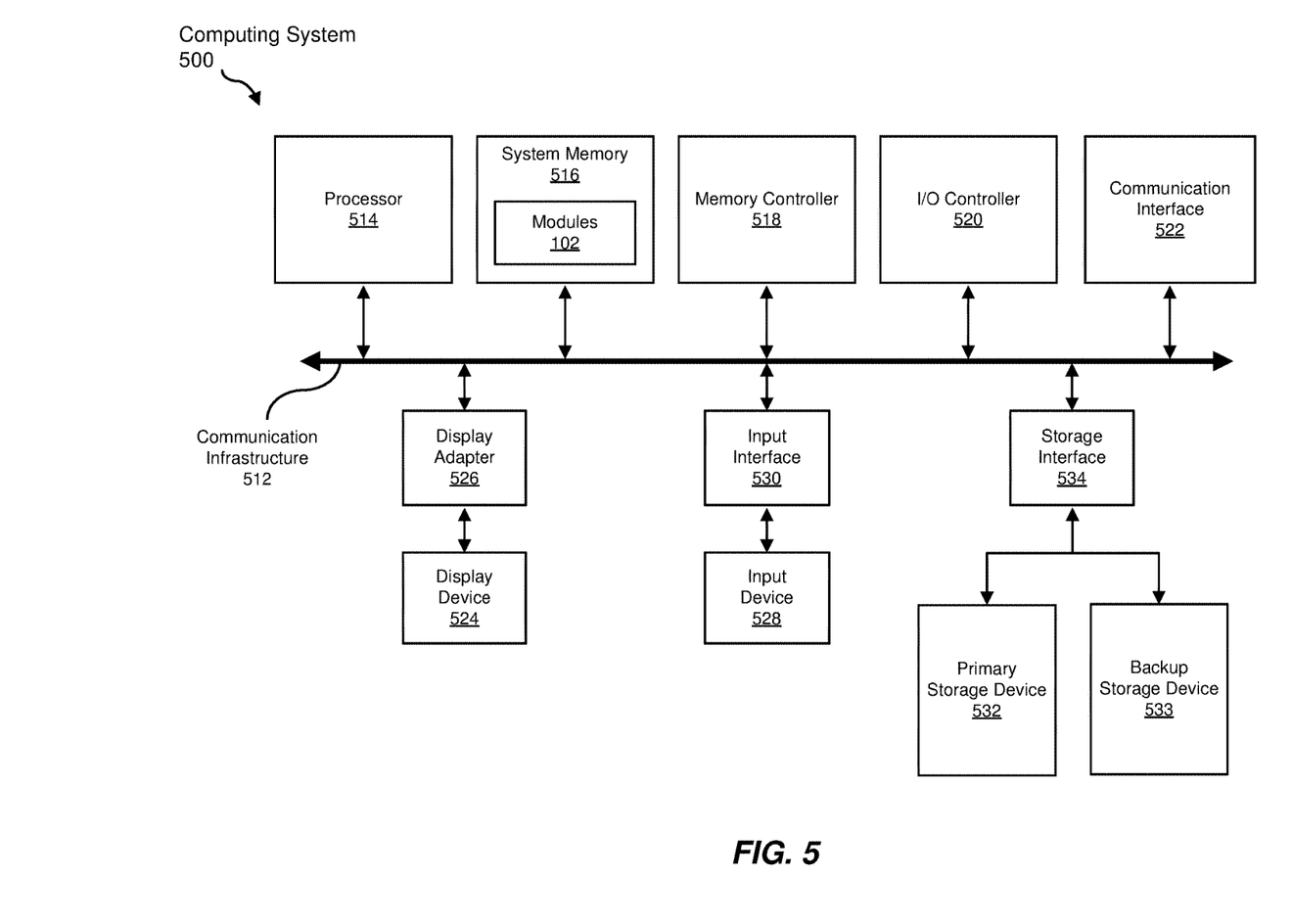
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or represent an apparatus that facilitates achieving user space intervention during connection-establishment handshakes.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, in kernel space on a server, a synchronize message from a computing device to initiate synchronization between the computing device and the server with respect to a communication protocol;
   in response to receiving the synchronize message, notifying an application in user space on the server of the synchronize message such that the application in user space on the server selects at least one attribute to be applied to a communication session resulting from the synchronization between the computing device and the server;
   receiving, in kernel space on the server from the application in user space, a selection that identifies the attribute to be applied to the communication session;
   sending, from kernel space on the server, a synchronize acknowledgement that identifies the attribute selected by the application in user space on the server to the computing device to further the synchronization between the computing device and the server; and
   establishing the communication session with the attribute selected by the application in user space on the server upon receiving, at the server, an acknowledgement message in kernel space on the server from the computing device to complete the synchronization.

2. The method of claim 1, wherein receiving the synchronize message at the server comprises receiving the synchronize message via a socket managed by an operating system kernel in kernel space on the server.

3. The method of claim 2, wherein notifying the application in user space on the server of the synchronize message comprises sending an accept system call from the operating system kernel in kernel space to the application in user space.

4. The method of claim 1, wherein:
   the communication protocol comprises a Transmission Control Protocol (TCP)
   the synchronization comprises a TCP handshake; and
   the communication session comprises a TCP session.

5. The method of claim 1, wherein the attribute to be applied to the communication session comprises a Maximum Segment Size (MSS).

6. The method of claim 1, wherein notifying the application in user space on the server of the synchronize message comprises delivering, to the application in user space, at least a portion of the synchronize message that specifies an identity of the computing device that sent the synchronize message.

7. The method of claim 6, wherein the application in user space made the selection of the attribute based at least in part on the identity of the computing device that sent the synchronize message.

8. The method of claim 1, further comprising:
   receiving, at the server, another synchronize message from another computing device to initiate synchronization between the other computing device and the server with respect to the communication protocol;
   in response to receiving the other synchronize message, notifying the application in user space on the server of the synchronize message such that the application in user space is able to determine whether to establish another communication session with the other computing device;
   receiving, from the application in user space, a directive to refuse to establish the other communication session with the other computing device due at least in part to an identity of the other computing device; and
   in response to receiving the directive, refusing to send another synchronize acknowledgement to the other computing device to ensure that the other communication session is not established between the other computing device and the server.

9. The method of claim 1, establishing the communication session with the attribute selected by the application in user space comprises enabling the computing device and the server to communicate with one another by way of the communication session to which the attribute has been applied.

10. A system comprising:
a receiving module, stored in memory at a server, that receives, in kernel space on the server, a synchronize message from a computing device to initiate synchronization between the computing device and the server with respect to a communication protocol;
a notification module, stored in memory, that notifies an application in user space on the server of the synchronize message such that the application in user space on the server selects at least one attribute to be applied to a communication session resulting from the synchronization between the computing device and the server;
wherein the receiving module receives, in kernel space on the server from the application in user space, a selection that identifies the attribute to be applied to the communication session,
a transmission module, stored in memory, that:
sends, from kernel space on the server, a synchronize acknowledgement that identifies the attribute selected by the application in user space on the server to the computing device to further the synchronization between the computing device and the server; and
establishes the communication session with the attribute selected by the application in user space on the server upon receiving, at the server, an acknowledgement message in kernel space on the server from the computing device to complete the synchronization; and
at least one physical processor that executes the receiving module, the notification module, and the transmission module.

11. The system of claim 10, wherein the receiving module receives the synchronize message via a socket managed by an operating system kernel in kernel space on the server.

12. The system of claim 11, wherein the notification module notifies the application in user space on the server of the synchronize message comprises sending an accept system call from the operating system kernel in kernel space to the application in user space.

13. The system of claim 10, wherein:
the communication protocol comprises a Transmission Control Protocol (TCP);
the synchronization comprises a TCP handshake; and
the communication session comprises a TCP session.

14. The system of claim 10, wherein the attribute to be applied to the communication session comprises a Maximum Segment Size (MSS).

15. The system of claim 10, wherein the notification module delivers, to the application in user space, at least a portion of the synchronize message that specifies an identity of the computing device that sent the synchronize message.

16. The system of claim 15, wherein the application in user space made the selection of the attribute based at least in part on the identity of the computing device that sent the synchronize message.

17. The system of claim 10, wherein:
the receiving module receives, at the server, another synchronize message from another computing device to initiate synchronization between the other computing device and the server with respect to the communication protocol;
the notification module notifies the application in user space on the server of the synchronize message such that the application in user space is able to determine whether to establish another communication session with the other computing device;
the receiving module receives, from the application in user space, a directive to refuse to establish the other communication session with the other computing device due at least in part to an identity of the other computing device; and
the transmission module refuses to send another synchronize acknowledgement to the other computing device to ensure that the other communication session is not established between the other computing device and the server.

18. An apparatus comprising:
at least one storage device that stores:
an operating system kernel that manages computer hardware and software processes in kernel space on a server; and
a user space application that runs in user space on the server; and
at least one physical processor communicatively coupled to the storage device, wherein the physical processor:
receives, in kernel space on the server, a synchronize message from a computing device to initiate synchronization between the computing device and the server with respect to a communication protocol;
notifies the application in user space on the server of the synchronize message such that the application in user space on the server selects at least one attribute to be applied to a communication session resulting from the synchronization between the computing device and the server;
receives, in kernel space on the server from the application in user space, a selection that identifies the attribute to be applied to the communication session;
sends, from kernel space on the server, a synchronize acknowledgement that identifies the attribute selected by the application in user space on the server to the computing device to further the synchronization between the computing device and the server; and
establishes the communication session with the attribute selected by the application in user space on the server upon receiving, at the server, an acknowledgement message in kernel space on the server from the computing device to complete the synchronization.

* * * * *